United States Patent [19]

Barnes

[11] Patent Number: 4,595,810

[45] Date of Patent: Jun. 17, 1986

[54] DEVICE FOR FOCUSING A LASER ON A RECORDING MEDIUM BY WAVELENGTH MODULATION

[75] Inventor: Ronald L. Barnes, Wichita, Kans.

[73] Assignee: NCR Corporation, Dayton, Ohio

[21] Appl. No.: 571,886

[22] Filed: Jan. 18, 1984

[51] Int. Cl.⁴ ............................................... G01J 1/20
[52] U.S. Cl. ...................................... 250/201; 369/45
[58] Field of Search ........................ 250/201, 204, 205; 350/3.72; 369/44, 45, 46

[56] References Cited

U.S. PATENT DOCUMENTS 4,280,215  7/1981  Okano ................................. 250/201

OTHER PUBLICATIONS

Smith, Modern Optical Engineering, p. 57, 1966.
Latta et al., IBM Tech Bulletin, vol. 22, No. 4, Sep. 1979, Multi-Function Holographic Element for Readout of High Density Recorded Data.

Primary Examiner—David C. Nelms
Assistant Examiner—James Gatto
Attorney, Agent, or Firm—J. T. Cavender; Edward Dugas; Floyd A. Gonzalez

[57] ABSTRACT

A device for focusing a laser on a recording medium by wavelength modulation is disclosed wherein the device includes a radiation source for providing a radiation beam of controllable frequency, a hologram intercepting the radiation beam for focusing the radiation beam as a function of its frequency, and a control system coupled to the radiation source for controlling the frequency of the radiation beam so as to focus the beam on a desired plane. The control system includes a sensor for detecting the focus of the radiation beam on a desired plane, and means for controlling the frequency of the radiation beam from the radiation source responsive to the detected focus.

7 Claims, 6 Drawing Figures

DEVICE FOR FOCUSING A LASER ON A RECORDING MEDIUM BY WAVELENGTH MODULATION

BACKGROUND OF THE INVENTION

The present invention relates to an apparatus for focusing a reading laser on a recording medium. More particularly, it relates to focusing a laser by wavelength modulation.

Many devices are known in which focusing of an optical system is accomplished by creating a control signal from characteristics of reflected light signals wherein the control signal controls the physical movement of a component in the optical path, such as physically moving a lens or deforming a mirror. Such systems are disclosed in, for instance, U.S. Pat. Nos. 3,610,934, issued Oct. 5, 1971 to Turner; 4,060,325, issued Nov. 29, 1977, to Nobusawa; 4,264,810 issued Apr. 28, 1981 to Utagawa et al.; 4,295,741 issued Oct. 20, 1981 to Palma et al.; and 4,358,774 issued Nov. 9, 1982 to Wilkinson.

In U.S. Pat. No. 3,992,575 issued Nov. 16, 1976 to Velzel et al., an apparatus is disclosed which projects two radiation spots, one before and one behind a desired plane, and the radiation spots are reflected to sensors for generating a correction signal to correct the focus of the apparatus in a known manner. Means for correcting the focus is not further described.

It is known that variations in input parameters of various laser generating devices result in varying the wavelength of the laser output of such devices. For instance, varying the electrical current of a diode type laser generator results in a corresponding variance in the wavelength of the laser output by such device. Also, by varying the wavelength of light input to the amplifier chamber of a dye laser generator, the output frequency of the laser output by such generators will correspondingly change.

SUMMARY OF THE INVENTION

In a preferred embodiment, the present invention includes a focusing apparatus for focusing a radiant beam on a desired plane. The focusing apparatus includes a radiation source for providing a radiation beam of controllable wavelength, a hologram intercepting the radiation beam for focusing the radiation beam as a function of its wavelength, and means coupled to the radiation source for controlling the wavelength of the radiation beam so as to focus the beam on a desired plane.

It is an object of the present invention to provide an apparatus for focusing a radiation beam by modulating the wavelength of the radiation beam.

It is another object of the present invention to provide an apparatus for reading optical data stored on a recording medium by a laser wherein the laser is focused on the recording medium by passing the laser through a hologram and controlling the frequency of the laser beam, thereby effecting the desired focusing.

It is a further object of the present invention to provide a means for focusing a radiant beam on a desired plane without physically moving any of the components of the optical path of the apparatus.

DESCRIPTION OF THE PREFERRED EMBODIMENT

Figure 1:
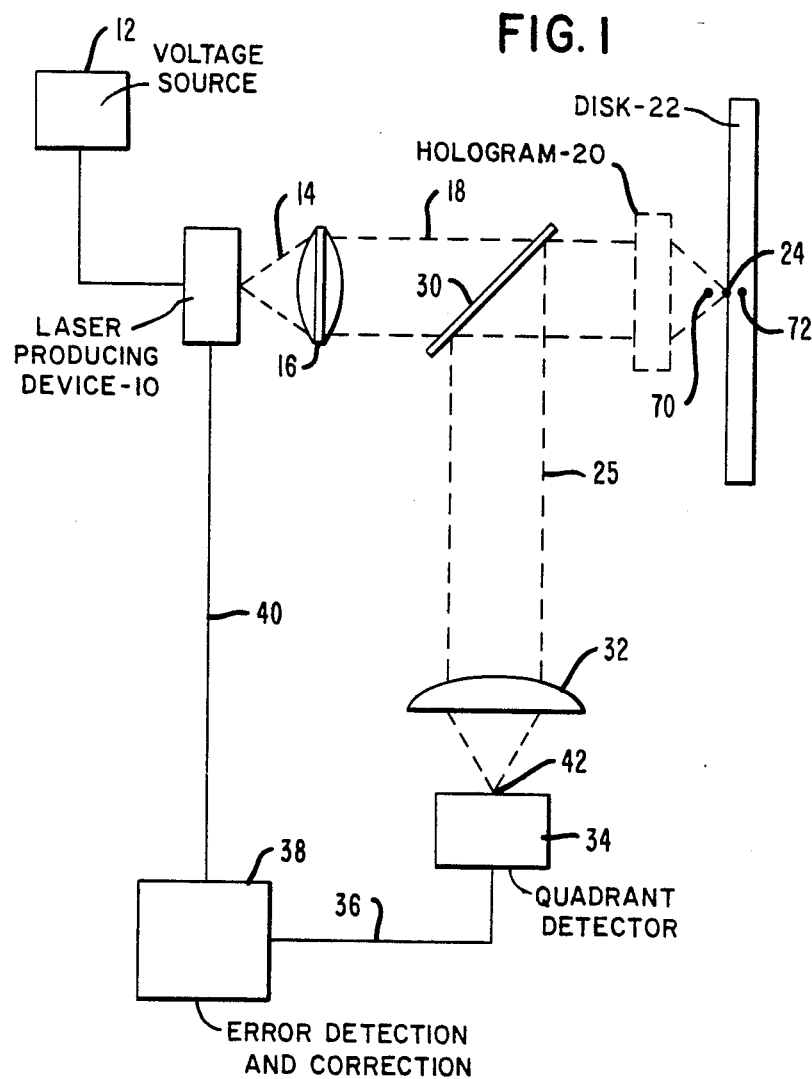
FIG. 1 is an illustration of one embodiment of a device using the present invention wherein auto focusing is accomplished by modulating the wavelength of a laser.

Referring to FIG. 1, an apparatus is illustrated having a system for optically focusing a radiation beam in the form of a laser on a medium for reading data optically recorded thereon. A laser producing device 10 is powered by a suitable voltage source 12 for producing a laser beam 14. In the embodiment shown in FIG. 1, the laser producing device 10 is a tunable diode type laser. As is known, the diode type laser produces a divergent beam 14. The divergent laser beam 14 is directed through a lens 16 which produces a collimated laser beam 18 to be focused on a recording medium.

The laser beam 18 is directed through a frequency dependent hologram 20 which focuses the laser beam 18 on a recording medium 22 upon which data has been optically recorded. The recording medium 22 may be a laser disk or other known medium for optically recording data.

The output wavelength of the laser producing device 10 is dependent upon the electrical current input to the device 10. Thus, by controlling the electrical current of the laser source 10, the output frequency of the laser beams 14 and 18 may be controlled.

The hologram 20 is a dicromate gel transmission hologram which is available from several sources. For instance, the hologram 20 is available from the International Dichromate Corporation of Draper, Utah; or the American Holographic Company of Acton, Md; or the Holograf Company of Santa Clara, Calif. The hologram 20 has a numerical aperture of 0.5, and has a nominal operating wavelength of 0.83 microns, with a focal length at that wavelength of less than 2 millimeters.

The exact focal length of the described hologram 20 is dependent upon the wavelength of the laser passing through the hologram. Thus, by controlling the electrical current of the laser source 10, the focal point on the optical recording medium 22 of a laser beam 18 shining through the hologram 20 may be controlled.

An auto focus device for focusing the laser beam 18 on focal point 24 on a desired plane includes a semi-transparent mirror 30 which reflects the laser beam returning from the recording medium 22 to a cylindrical type lens 32 which in turn focuses the reflected laser beam 25 upon a quadrant type detector 34. The output of the quadrant detector 34 is directed over an electrical connection 36 to an error detection and correction circuit 38 which generates a control signal directed over conductor 40 to the laser source 10. The control signal is used to modulate the electrical current of the laser source 10, thereby changing the wavelength of the laser beams 14 and 18 such that the laser beam 18 is focused on the desired focal point 24.

Figure 2:
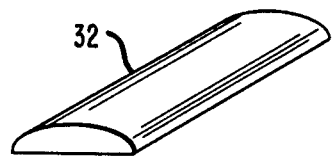
FIG. 2 is an illustration of a cylindrical type lens useable with the device of FIG. 1.

As shown in FIG. 2, the cylindrical lens 32 is shaped in a half cylindrical fashion as is known in the art. The optical path from the focal point 24 to the lens 32 and the distance between the lens 32 and the quadrant detector 34 is adjusted such that when the laser beam 18 is exactly focused on focal point 24 on a desired plane on recording medium 22, the reflected laser beam 25 is also in focus at focal point 42 on the surface of the quadrant detector 34.

Figure 3:
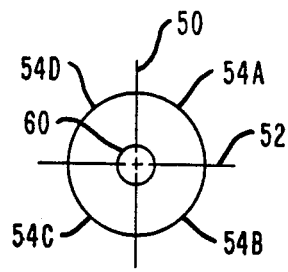
FIGS. 3, 4 and 5 are illustrations of reflected optical signals received by a quadrant detector of the apparatus of FIG. 1.

As is shown in FIG. 3, the quadrant detector is divided along axes 50 and 52 which divides the detector 34 into four quadrants 54A-54D. As shown in FIG. 3, when the reflected laser beam 25 is exactly focused on focal point 24 of FIG. 1, a circle 60 is focused at the intersections of the axes 50 and 52 on the surface of the quadrant detector 34 such that each of the quadrants 54A-54D are equally illuminated.

Figure 4:
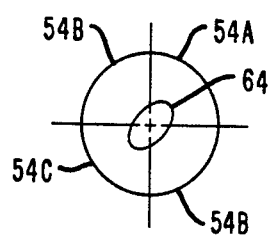
Figure 5:
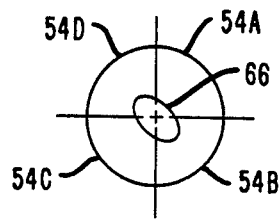

When the laser beam 18 is not in focus at the focal point 24 of FIG. 1, but is focused at a point 70 as shown in FIG. 1 on one side of the focal point 24, an elliptical area 64 is illuminated on the surface of the quadrant detector 34 with its major axis running at a diagonal such that quadrants 54A and 54C are more illuminated than quadrants 54B and 54D, as shown in FIG. 4. If the laser beam 18 is focused on a point 72 as shown in FIG. 1 on the other side of focal point 24, an elliptical area 66 is illuminated on the surface of detector 34 with its major axis on a diagonal such that quadrants 54B and 54D are more illuminated than quadrants 54A and 54C, as shown in FIG. 5. The error detection and correction circuit 38 measures the difference in the signals coming from the quadrants 54A through 54D to generate the correction signal over conductor 40 to the laser source 10 for correcting the frequency of the laser output of laser producing device 10 until the laser beam 18 is again focused on focal point 24. Such a quadrant detector is available from Hughes Aircraft Company of El Segundo, Calif. Error detection and correction circuits usable to detect the difference of signals from the quadrant detector to generate a correcting signal are well-known in the art and need not be further described.

Figure 6:
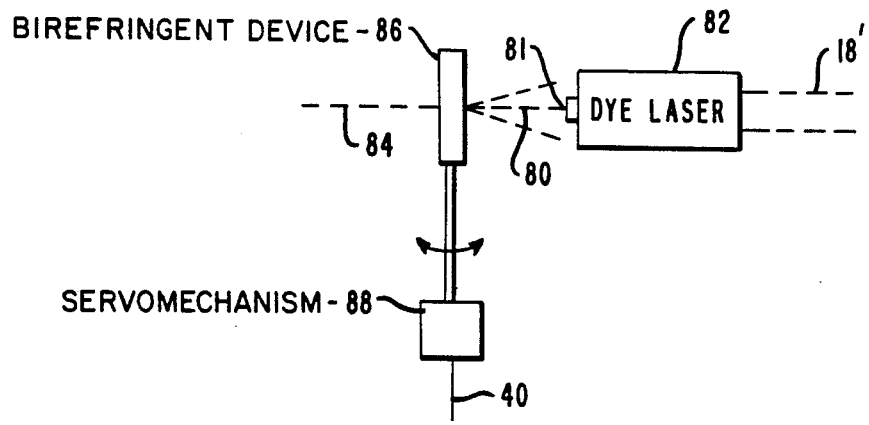
FIG. 6 is another embodiment of a wavelength modulatable laser useable with the invention.

In addition to the tunable laser diode used in the embodiment of FIG. 1, a wavelength modulatable dye laser may be used. With such a laser, the wavelength of the laser output is dependent upon the wavelength of light input into the amplifier chamber of the laser generator. FIG. 6 is an illustration of the laser generator of such a system wherein the wavelength of light 80 received by the amplifier chamber 81 of a dye laser apparatus 82 is controlled by passing a light beam 84 through a means for angularly separating light into a spectrum such as a birefrigent device 86. The exact portion of the spectrum of the light from the birefrigent device 86 entering the amplifier chamber 81 depends on the orientation of the birefrigent device 86. Such a tunable dye laser is available from Quantel International of Santa Clara, California, 95050 under the designation of Datachrom-5000 YAG/Dye laser system. The exact orientation of the birefrigent device 86 is controlled by a servomechanism 88 which rotates the device 86 in accordance with a control signal over conductor 40, which is the same as the conductor 40 in FIG. 1. The output of such a dye laser device 82 is a collimated laser beam 18', and thus a lens such as lens 16 shown in FIG. 1, is not needed. The hologram focusing and auto focusing portion of an embodiment using the dye laser device of FIG. 6 is the same as that used in the embodiment of FIG. 1, and need not be described again for the understanding of one skilled in the art.

Thus, the invention described herein provides an auto focusing device which focuses a radiation beam on a desired plane by passing the radiant beam through a frequency dependent hologram onto the desired plane. The auto focus device includes a feedback system which changes the frequency of the laser beam until the laser beam is focused upon the plane.

While several embodiments of the present invention have been disclosed, it will be understood that the disclosed embodiments are exemplary only, and that modifications and changes may be made by those skilled in the art without departing from the spirit and scope of the invention as set forth in the appended claims.

What is claimed is:

1. A focusing apparatus for focusing a radiant beam on a desired plane comprising:
    a radiation source for providing a radiation beam of controllable wavelength;
    a hologram intercepting said radiation beam at a fixed distance from the desired plane, for focusing said radiation beam as a function of the wavelength of said radiation beam; and
    controlling means coupled to said radiation source for controlling the wavelength of said radiation beam so as to focus said beam on a desired plane.

2. The focusing apparatus of claim 1 wherein the controlling means includes focus detecting means for detecting the focusing of said radiation beam on a desired plane; and
    error detection and correction means responsive to said focus detecting means for generating a correction signal for controlling the wavelength of said radiation beam responsive to the focus of said radiation beam.

3. The focusing apparatus of claim 2 wherein said focus detecting means includes a quadrant detector.

4. The focusing apparatus of claim 1 wherein said radiation source comprises a tunable laser diode device, and said controlling means controls the electrical current of said tunable laser diode device.

5. The focusing apparatus of claim 1 wherein said radiation source comprises a dye laser generator, said dye laser generator including an amplifier chamber operable for receiving radiant energy of variable wavelength, and light separating means for angularly separating light into a spectrum, said light separating means operable to be oriented with respect to said amplifier chamber for supplying radiant energy thereto of a selectable wavelength.

6. The focusing apparatus of claim 5 wherein said controlling means is operable for changing the orientation of said light separating means with respect to said amplifier chamber thereby changing the wavelength of radiant energy supplied to said amplifier chamber.

7. A method of focusing a radiant beam on a desired plane comprising:
    providing a radiation beam of controllable wavelength;
    intercepting at a fixed distance from a desired plane, said radiation beam with a hologram for focusing said radiation beam as a function of the wavelength of said radiation beam; and
    controlling the wavelength of said radiation beam so as to focus said beam on the desired plane.

* * * * *